US007080912B2

(12) United States Patent
Cook

(10) Patent No.: US 7,080,912 B2
(45) Date of Patent: Jul. 25, 2006

(54) HIGH-RESOLUTION, ALL-REFLECTIVE IMAGING SPECTROMETER

(75) Inventor: Lacy G. Cook, El Segundo, CA (US)

(73) Assignee: Raytheon Company, Waltham, MA (US)

( * ) Notice: Subject to any disclaimer, the term of this patent is extended or adjusted under 35 U.S.C. 154(b) by 9 days.

(21) Appl. No.: 11/034,412

(22) Filed: Jan. 12, 2005

(65) Prior Publication Data
US 2005/0134844 A1 Jun. 23, 2005

Related U.S. Application Data

(63) Continuation of application No. 10/374,911, filed on Feb. 25, 2003, now Pat. No. 6,886,953, which is a continuation-in-part of application No. 10/104,424, filed on Mar. 22, 2002, now Pat. No. 6,902,282.

(51) Int. Cl.
*G02B 5/10* (2006.01)
(52) U.S. Cl. ................... 359/859; 359/858; 359/861
(58) Field of Classification Search ................ None
See application file for complete search history.

(56) References Cited

U.S. PATENT DOCUMENTS

| 4,101,195 A | 7/1978 | Frosch | 359/366 |
|---|---|---|---|
| 4,265,510 A | 5/1981 | Cook | 359/366 |
| 4,733,955 A | 3/1988 | Cook | 359/859 |
| 4,834,517 A | 5/1989 | Cook | 359/366 |
| 5,166,755 A | 11/1992 | Gat | 356/419 |
| 5,170,284 A | 12/1992 | Cook | 359/365 |
| 5,260,767 A | 11/1993 | Cook | 356/326 |
| 5,550,672 A | 8/1996 | Cook | 359/365 |
| 5,724,131 A | 3/1998 | Chim et al. | 356/237.1 |
| 6,072,852 A | 6/2000 | Hudyma | 378/34 |
| 6,100,974 A | 8/2000 | Reininger | 356/300 |
| 6,122,051 A | 9/2000 | Ansley et al. | 356/326 |
| 6,288,781 B1 | 9/2001 | Lobb | 356/326 |
| 6,292,212 B1 | 9/2001 | Zigadio et al. | 348/33 |
| 6,886,953 B1 * | 5/2005 | Cook | 359/859 |

OTHER PUBLICATIONS

J.F. James and R.S. Sternberg, "The Design of Optical Spectrometers", Chapman and Hall, Ltd., pp. 62-68 (1969).
Milton Laikin, "Lens Design", Marcel Dekker, Inc., New York, 1991, pp. 1-14 (1990).

* cited by examiner

Primary Examiner—Arnel C. Lavarias
(74) Attorney, Agent, or Firm—John E. Gunther; Leonard A. Alkov; Karl A. Vick

(57) ABSTRACT

An imaging spectrometer includes an all-reflective objective module that receives an image input and produces an objective module output at an exit slit, and an all-reflective collimating-and-imaging module that receives the objective module output as an objective-end input and produces a collimating-end output, wherein the collimating-and-imaging module comprises a reflective triplet. A dispersive element receives the collimating-end output and produces a dispersive-end input into the collimating-and-imaging module that is reflected through the collimating-and-imaging module to produce a spectral-image-end output. An imaging detector receives the spectral-image-end output of the collimating-and-imaging module. The objective module may be a three-mirror anastigmat having an integral corrector mirror therein, or an all-reflective, relayed optical system comprising a set of five powered mirrors whose powers sum to substantially zero. The collimating-and-imaging module may be optimized to minimize spectral smile.

24 Claims, 10 Drawing Sheets

FIG. 6A

| DESCRIPTION | RADIUS (LINEAR UNITS) | Y | D | E | F | G |
|---|---|---|---|---|---|---|
| ENTRANCE PUPIL | INFINITY | 0 | 0 | 0 | 0 | 0 |
| PRIMARY MIRROR | -77.295 | -1.84158 | -4.7443×10⁻⁰⁸ | -1.9230×10⁻¹⁰ | 1.9308×10⁻¹² | -4.7280×10⁻¹⁵ |
| SECONDARY MIRROR | -25.9363 | -0.38368 | -7.5621×10⁻⁰⁷ | -2.5870×10⁻⁰⁹ | 6.4008×10⁻¹¹ | -5.6913×10⁻¹³ |
| TERTIARY MIRROR | -38.9753 | 0.20162 | 7.1130×10⁻⁰⁸ | -7.3004×10⁻¹¹ | 1.7701×10⁻¹³ | -2.5139×10⁻¹⁶ |
| IMAGE PLANE | INFINITY | 0 | 0 | 0 | 0 | 0 |

APERTURE DIAMETER: 10 UNITS
FOCAL LENGTH: 40 UNITS
SPEED: F/4.0
FIELD OF VIEW: 1 (TANGENTIAL) X 20 (SAGITTAL) DEG.
FIELD OFFSET: -8.019 DEG.
ALL TILTS AND DECENTERS ARE RELATIVE TO A COMMON REFERENCE AXIS; ALL ARE IN THE TANGENTIAL PLANE
DECENTERS ARE IMPLIMENTED BEFORE TILTS
POSITIVE TILTS TAKE THE Z-AXIS INTO/TOWARDS THE Y-AXIS

FIG.6B

| DESCRIPTION | SPACING (LINEAR UNITS) | DECENTER (LINEAR UNITS) | TILTS (DEGREES) |
|---|---|---|---|
| ENTRANCE PUPIL | 23.5206 | -9.42 | 0 |
| PRIMARY MIRROR | -20.0837 | 0.4769 | 0.0904 |
| SECONDARY MIRROR | 20.1226 | -0.4963 | 0.7364 |
| TERTIARY MIRROR | -28.1885 | 0.5071 | -0.1539 |
| IMAGE PLANE | 0 | 0 | 0 |

FIG. 7A

| DESCRIPTION | RADIUS (LINEAR UNITS) | K | D | E | F | G |
|---|---|---|---|---|---|---|
| SLIT PLANE | INFINITY | 0 | 0 | 0 | 0 | 0 |
| TERTIARY MIRROR | -38.9753 | 0.20162 | 7.1130×10⁻⁰⁸ | -7.3004×10⁻¹¹ | 1.7701×10⁻¹³ | -2.5139×10⁻¹⁶ |
| SECONDARY MIRROR | 25.9363 | -0.38368 | -7.5621×10⁻⁰⁷ | -2.5870×10⁻⁰⁹ | 6.4008×10⁻¹¹ | -5.6913×10⁻¹³ |
| PRIMARY MIRROR | -77.295 | -1.84158 | -4.7443×10⁻⁰⁸ | -1.9230×10⁻¹⁰ | 1.9308×10⁻¹² | -4.7280×10⁻¹⁵ |
| CIZnS PRISM | INFINITY | 0 | 0 | 0 | 0 | 0 |
| SAPPHIRE PRISM | INFINITY | 0 | 0 | 0 | 0 | 0 |
| AIR | INFINITY | 0 | 0 | 0 | 0 | 0 |
| FLAT MIRROR/STOP | INFINITY | 0 | 0 | 0 | 0 | 0 |
| SAPPHIRE PRISM | INFINITY | 0 | 0 | 0 | 0 | 0 |
| CIZnS PRISM | INFINITY | 0 | 0 | 0 | 0 | 0 |
| AIR | INFINITY | 0 | 0 | 0 | 0 | 0 |
| PRIMARY MIRROR | -77.295 | -1.84158 | -4.7443×10⁻⁰⁸ | -1.9230×10⁻¹⁰ | 1.9308×10⁻¹² | -4.7280×10⁻¹⁵ |
| SECONDARY MIRROR | -25.9363 | -0.38368 | -7.5621×10⁻⁰⁷ | -2.5870×10⁻⁰⁹ | 6.4008×10⁻¹¹ | -5.6913×10⁻¹³ |

FIG. 7B

| DESCRIPTION | RADIUS (LINEAR UNITS) | K | D | E | F | G |
|---|---|---|---|---|---|---|
| TERTIARY MIRROR | -38.9753 | 0.20162 | 7.1130×10⁻⁸ | -7.3004×10⁻¹¹ | 1.7701×10⁻¹³ | -2.5139×10⁻¹⁶ |
| DETECTOR PLANE | INFIXITY | 0 | 0 | 0 | 0 | 0 |

SPECTRAL BAND IS 0.40-2.5 MICRONS; 1.55 MICRONS MIDPOINT
STOP DIAMETER IS 10 UNITS
FIELD OF VIEW AT STOP IS 1 (TANGENTIAL) X 20 (SAGITTAL) DEG.
IMAGE FORMAT IS 0.695 (TANGENTIAL) X 14.106 (SAGITTAL) UNITS
COLLIMATOR/IMAGER FOCAL LENGTH IS 40 UNITS
ALL DECENTERS AND TILTS RELATIVE TO COMMON REFERENCE AXIS
DECENTERS AND TILTS ARE IMPLEMENTED BEFORE TILTS
POSITIVE TILTS TAKE THE Z-AXIS INTO/TOWARD THE Y-AXIS
ALL SPACINGS ARE MEASURED ALONG THE COMMON REFERENCE AXIS

FIG. 7C

| DESCRIPTION | SPACING (LINEAR UNITS) | DECENTER (LINEAR UNITS) | TILT (DEGREES) |
|---|---|---|---|
| SLIT PLANE | 28.1885 | 8.013 | 0 |
| TERTIARY MIRROR | -20.1226 | 0.5071 | -0.1539 |
| SECONDARY MIRROR | 20.0837 | -0.4963 | 0.7367 |
| PRIMARY MIRROR | -18.7995 | 0.4769 | 0.0904 |
| ClZnS PRISM | -0.347 | 0 | 0.8988 |
| SAPPHIRE PRISM | -3.4017 | 0 | 0 |
| AIR | 0.676 | 0 | 12.5996 |
| FLAT MIRROR/STOP | -0.676 | -8.8332 | -0.3243 |
| SAPPHIRE PRISM | 3.4017 | 0 | 12.5996 |
| ClZnS PRISM | 0.347 | 0 | 0 |
| AIR | 18.7995 | 0 | 0.8988 |
| PRIMARY MIRROR | -20.0837 | 0.4769 | 0.0904 |
| SECONDARY MIRROR | 20.1226 | -0.4963 | 0.7367 |
| TERTIARY MIRROR | -28.1885 | 0.5071 | -0.1539 |
| DETECTOR PLANE | 0 | 8.013 | 0 |

HIGH-RESOLUTION, ALL-REFLECTIVE IMAGING SPECTROMETER

This application is a continuation of application Ser. No. 10/374,911, filed Feb. 25, 2003 now U.S. Pat. No. 6,886, 953, for which priority is claimed and whose disclosure is incorporated by reference: which in turn is a continuation-in-part of application Ser. No. 10/104,424, filed Mar. 22, 2002 now U.S. Pat. No. 6,902,282, for which priority is claimed and whose disclosure is incorporated by reference.

This invention relates to an imaging spectrometer, more particularly to an all-reflective imaging spectrometer, and in some embodiments to an approach for reducing spectral smile.

BACKGROUND OF THE INVENTION

Imaging spectrometers operable to form high-resolution images in a wide range of spectral bands are used in scientific, military, and resource-sensing applications. In one form of the imaging spectrometer, an objective optic forms an image of a scene at a slit. One portion of the scene is imaged by a panchromatic detector located at the image plane. A double-pass collimating-and-imaging optic receives another portion of the image passed through the slit and directs it to a dispersive element. The dispersed image is passed back through the collimating-and-imaging optic to a two-dimensional hyper-spectral imaging detector array located at the plane of the slit. One dimension of the array contains spatial information, and the other dimension contains spectral information. To view and spectrally analyze a two-dimensional scene, the entire imaging spectrometer is scanned in a direction perpendicular to the slit. Existing imaging spectrometers use refractive optics, reflective optics, or a combination of the two.

While operable, the available imaging spectrometers have some shortcomings. They tend to suffer from a problem called "spectral smile", which is an in-plane curvature of the spectral information provided by the hyper-spectral imaging detector. Additionally, they tend to have a relatively narrow field of view. The narrow field of view limits the lateral viewing range, and the spectral smile limits the usefulness of the results for some applications. For those cases where the optics contains refractive elements, there is a sensitivity to temperature changes and to the effects of radiation, particularly in a space environment.

There a need for an improved approach to an imaging spectrometer. The present invention fulfills this need, and further provides related advantages.

SUMMARY OF THE INVENTION

The present approach provides an imaging spectrometer. The optics of the imaging spectrometer includes only reflective elements (i.e., mirrors), achieving wide spectral coverage and avoiding the various limitations of refractive elements such as chromatic aberration, spectral limitations, thermal sensitivity, sensitivity to radiation, and the high cost of lenses. The panchromatic and hyper-spectral image planes are flat, facilitating the detection of the images.

In accordance with one aspect of the invention, an imaging spectrometer comprises an all-reflective imaging spectrometer optical system having an all-reflective objective module that receives an image input and produces an objective module output at an exit slit, wherein the objective module is a three-mirror anastigmat having an integral corrector mirror therein, or an all-reflective, relayed optical system comprising a set of five powered mirrors whose powers sum to substantially zero. The imaging spectrometer further includes an all-reflective collimating-and-imaging module that receives at least a portion of the objective module output as an objective-end input and produces a collimating-end output, wherein the collimating-and-imaging module comprises a reflective triplet, and a dispersive element that receives the collimating-end output and produces a dispersive-end input into the collimating-and-imaging module that is reflected through the collimating-and-imaging module to produce a spectral-image-end output.

The collimating-and-imaging module may optionally be structured to minimize spectral smile.

The dispersive element may be of any operable type, such as a reflection grating or a prism.

There is preferably also a panchromatic imaging detector that receives at least a portion of the objective module output. The separation of the objective module output may be accomplished either spatially by placing the panchromatic imaging detector laterally adjacent to the exit slit, or spectrally using a dichroic beamsplitter. A hyper-spectral imaging detector receives at least a portion of the spectral-image-end output of the collimating-and-imaging module. The panchromatic imaging detector and the hyper-spectral imaging detector are located on opposite sides of an image plane coincident with the exit slit. The image plane, and thence the panchromatic imaging detector and the hyper-spectral imaging detector, are preferably substantially flat.

In these configurations, there are excellent pupil matching characteristics from the entrance pupil of the objective module, to the reimaged stop at the exit pupil of the objective module (which is also the entrance pupil of the collimating-and-imaging module), and on to the dispersive element. The objective module and the collimating-and-imaging module are able to interface at an image plane that may have, by virtue of the characteristics of the objective module, significant non-normal incidence angles of the f-cones.

The objective-module foreoptics is diffraction limited at visible wavelengths for apertures of about one-half meter or more, and can cover cross-scan fields of view of about 3 degrees or more. The collimating-and-imaging module rear optics covers a reimaged field of view that is in the range of about 20 degrees or more, and allows for a dispersive element that is considerably smaller (on the order of from about 1/7 to about 1/10 the size, or even smaller) than the primary mirror of the objective-module foreoptics. Consequently, the high-performance imaging spectrometer is of an acceptably small size in comparison to the size of the objective-module foreoptics.

Since the amount of information that an optical system can pass is proportional to the product of the aperture and field-of-view sizes, it is natural to generally expect that as the size of the desired field of view increases to larger values, the aperture size would decrease in somewhat the same proportion. Also, since the optical resolution is proportional to the aperture size, this is equivalent to the statement that covering a small field of view at high resolution would involve about the same amount of data or information as covering a large field of view at low resolution. In the case of imaging spectrometers, a wider field of view would be imaged through a smaller objective-module aperture. Since the field of view of the collimating and imaging module can remain at a reasonably high value of 20 degrees or more, the ratio of collimating-and-imaging module field of view to objective-module field of view would decrease. In the same sense, the ratio of the apertures of the collimating-and-imaging module to objective-module would increase from the above values to values approaching ½, ⅟₁, or larger. This aperture-field product is the optical invariant that is preserved throughout the optical system.

To further illustrate this relationship, one can assume that a collimating-and-imaging module with an aperture of 3 inches and a field of view of 20 degrees is acceptable for a given application. This yields a product of 60 inch-degrees. Any acceptable objective module with an equal product may then be consistent with this: 40 inches aperture and 1.5 degrees field of view, 20 inches and 3 degrees, 10 inches and 6 degrees, 5 inches and 12 degrees, 2.5 inches and 24 degrees, etc. In the above progression, the ratio of collimating-and-imaging module field of view to objective-module field of view is decreasing, while the ratio of the apertures of the collimating-and-imaging module to objective-module is increasing. The method and technique for selecting an appropriate optical form for one of these objective-module examples is set forth in the detailed description below.

In another embodiment, an imaging spectrometer comprises an all-reflective objective module that receives an image input and produces an objective module output at an exit slit, and an all-reflective collimating-and-imaging module that receives at least a portion of the objective module output as an objective-end input and produces a collimating-end output, wherein the collimating-and-imaging module comprises a reflective triplet. The imaging spectrometer further includes a dispersive element that receives the collimating-end output and produces a dispersive-end input into the collimating-and-imaging module that is reflected through the collimating-and-imaging module to produce a spectral-image-end output. The two-pass collimating-and-imaging module is characterized by the presence of an intentionally introduced classical distortion, including pincushion or barrel distortion, that is one-half of the magnitude of the spectral smile introduced by the dispersive element.

The objective module is preferably a three-mirror anastigmat, a three-mirror anastigmat having an integral corrector mirror therein, or an all-reflective, relayed optical system comprising a set of five powered mirrors whose powers sum to substantially zero.

The dispersive element may be of any operable type, such as a reflection grating or a prism.

There is preferably also a panchromatic imaging detector that receives at least a portion of the objective module output, and a hyper-spectral imaging detector that receives at least a portion of the spectral-image-end output of the collimating-and-imaging module. The panchromatic imaging detector and the hyper-spectral imaging detector are located on opposite sides of an image plane coincident with the exit slit. The image plane, and thence the panchromatic imaging detector and the hyper-spectral imaging detector, are preferably flat.

In this embodiment, the advantages of the prior embodiment are also achieved, and additionally the magnitude of the "spectral smile" is reduced or eliminated.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 6 is an example of a prescription for an optical triplet to reduce spectral smile.

FIG. 7 is an example utilizing the optical prescription of FIG. 6, now used in double-pass and in conjunction with a two-material prism to demonstrate the cancellation of the spectral smile.

DETAILED DESCRIPTION OF THE INVENTION

Figure 1:
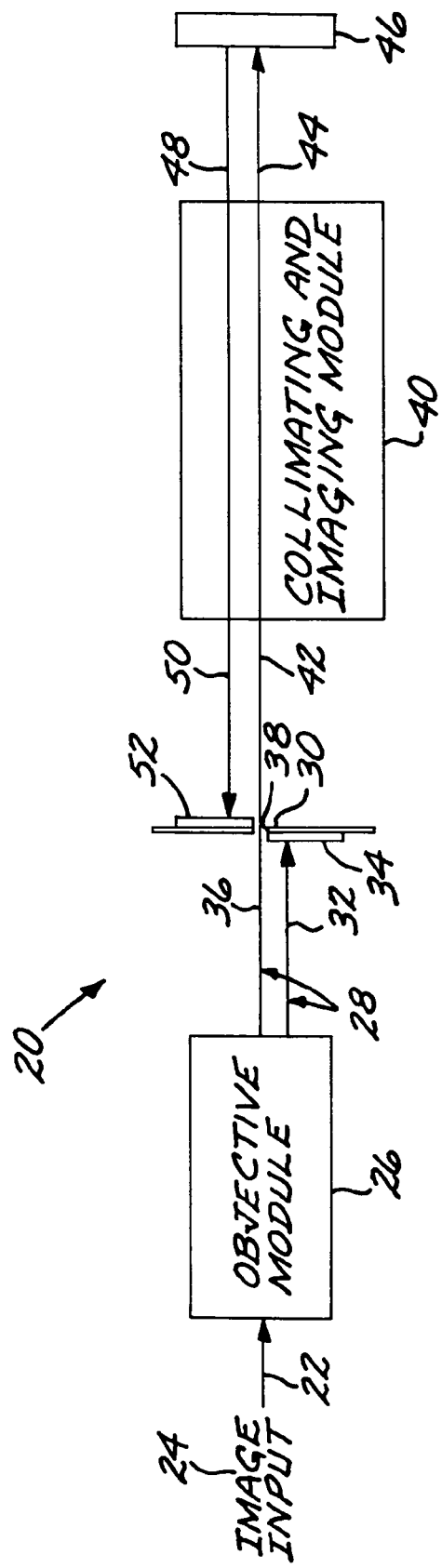
FIG. 1 is a schematic block diagram of an imaging spectrometer.

FIG. 1 schematically depicts in general form an imaging spectrometer 20 comprising an all-reflective imaging spectrometer optical system. Light energy 22 from an image input 24 of a viewed scene enters an all-reflective objective module 26, which serves as the foreoptics of the imaging spectrometer 20. (As used herein, "all-reflective" means that the optical module or element contains only reflective optical elements such as mirrors in the optical path, and no powered refractive optical elements such as lenses in the optical path.) The objective module 26 produces an objective module output 28 that is directed to an image plane 30, which is preferably flat. A first portion 32 of the objective module output 28 is incident upon a panchromatic imaging detector 34, which is also preferably flat, located at the image plane 30 and facing the objective module 26. A second portion 36 of the objective module output 28 passes through an exit slit 38 located at the image plane 30. The second portion 36 of the objective module output 28 is received by an all-reflective collimating-and-imaging module 40 as an objective-end input 42. The collimating-and-imaging module 40, which serves as the rear-optics of the imaging spectrometer 20, is preferably a reflective triplet. The collimating-and-imaging module 40 produces a collimating-end output 44. A dispersive element 46 receives the collimating-end output 44 and after reflection produces a dispersive-end input 48 that passes back into the collimating-and-imaging module 40. After being reflected back through the collimating-and-imaging module 40, this dispersive-end input 48 becomes a spectral-image-end output 50. At least a portion of the spectral-image-end output 50 is incident upon a hyper-spectral imaging detector 52, which is located at the image plane 30 and faces the collimating-and-imaging module 40 so as to receive the spectral-image-end output 50.

The output signal of the panchromatic imaging detector 34 is a broad spectral band image of the image input 24. The output signal of the hyperspectral-imaging detector yields spectral information for the slice of the image input 24 corresponding to the exit slit 38. To obtain the panchromatic and spectral information for the entire two-dimensional image input 24, the entire imaging spectrometer 20 is scanned in a direction perpendicular to the exit slit 38.

Figure 2:
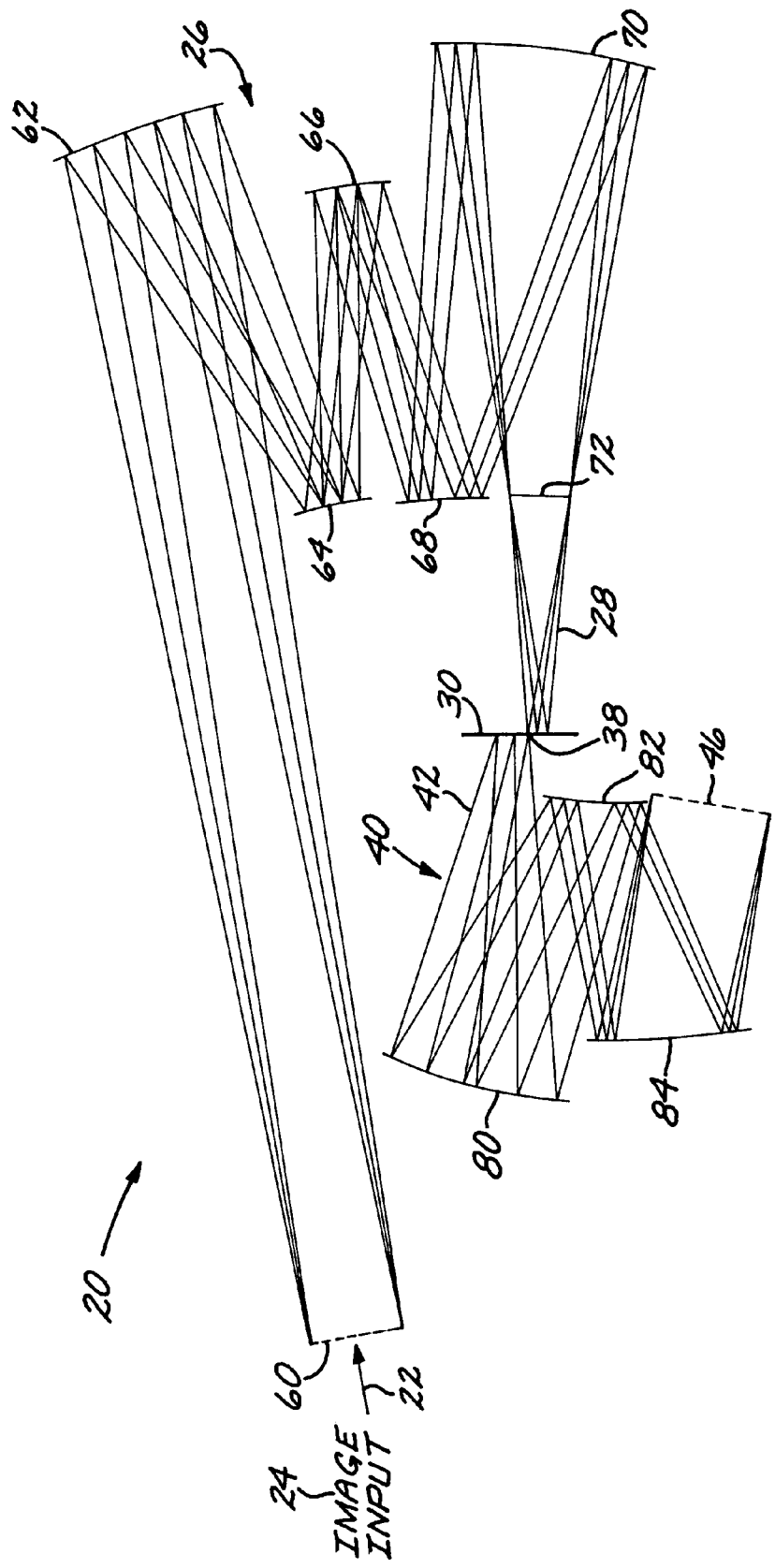
FIG. 2 is a spectral-dimension schematic view of the imaging spectrometer using an all-reflective, relayed optical system comprising a set of five powered mirrors whose powers sum to substantially zero in the objective module.
Figure 3:
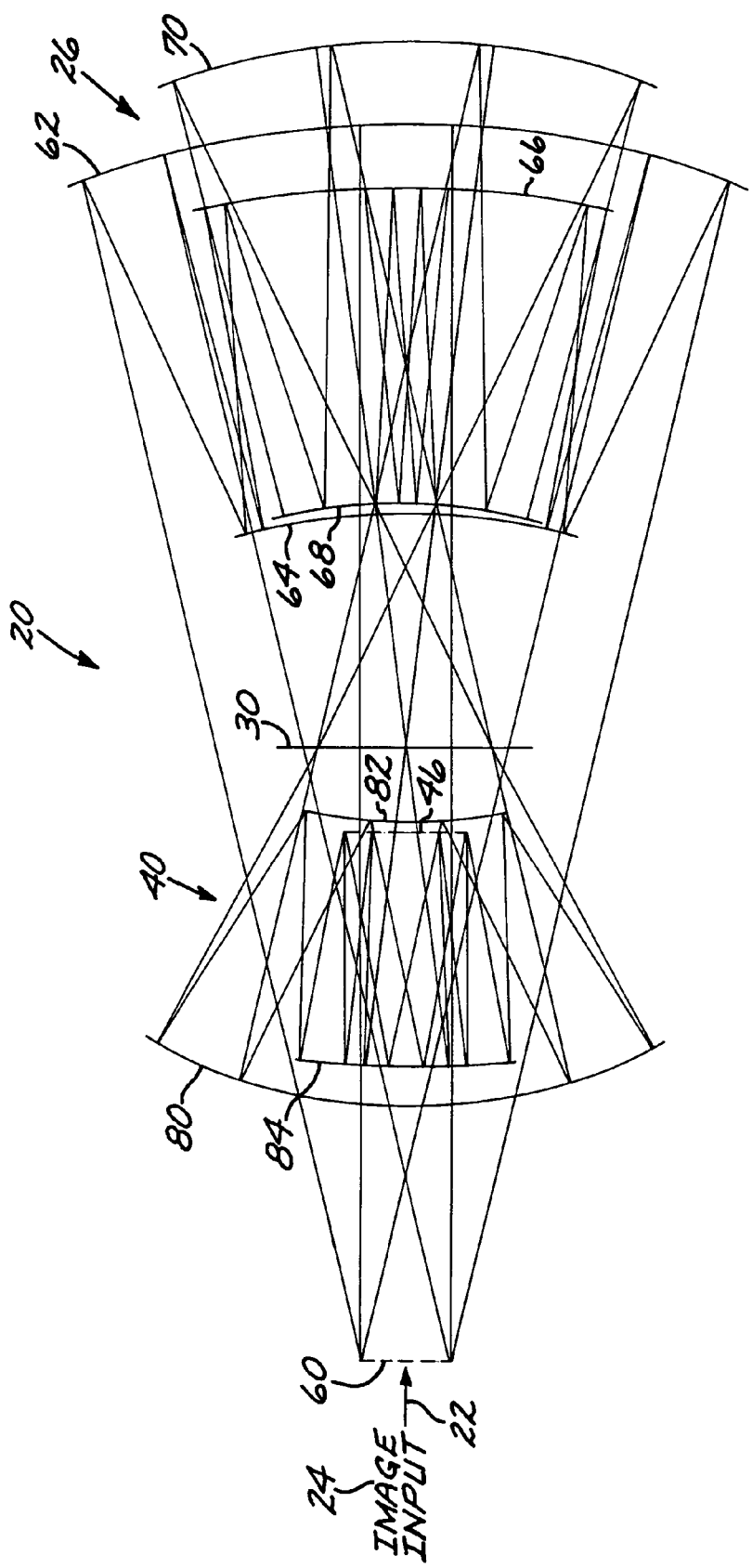
FIG. 3 is a spatial-dimension schematic view of the imaging spectrometer of FIG. 2.
Figure 4:
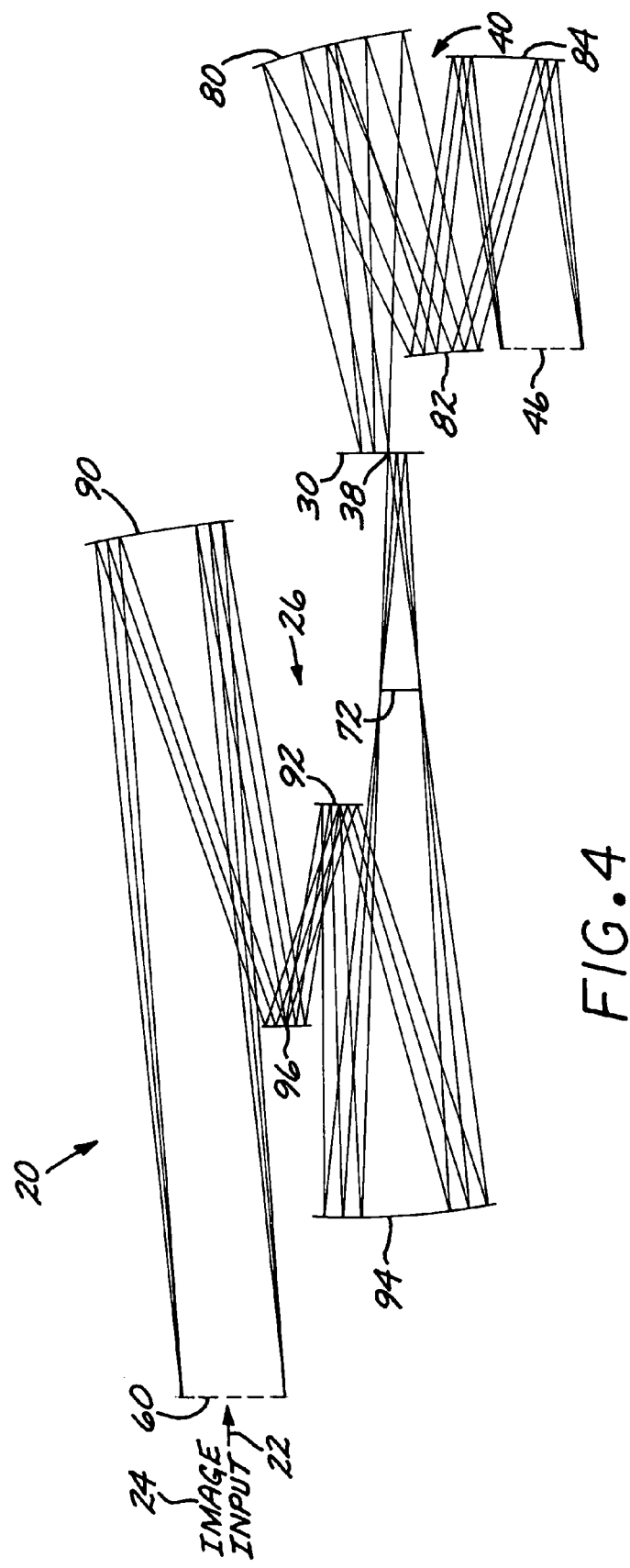
FIG. 4 is a spectral-dimension schematic view of the imaging spectrometer using a three-mirror anastigmat having an integral corrector mirror in the objective module.
Figure 5:
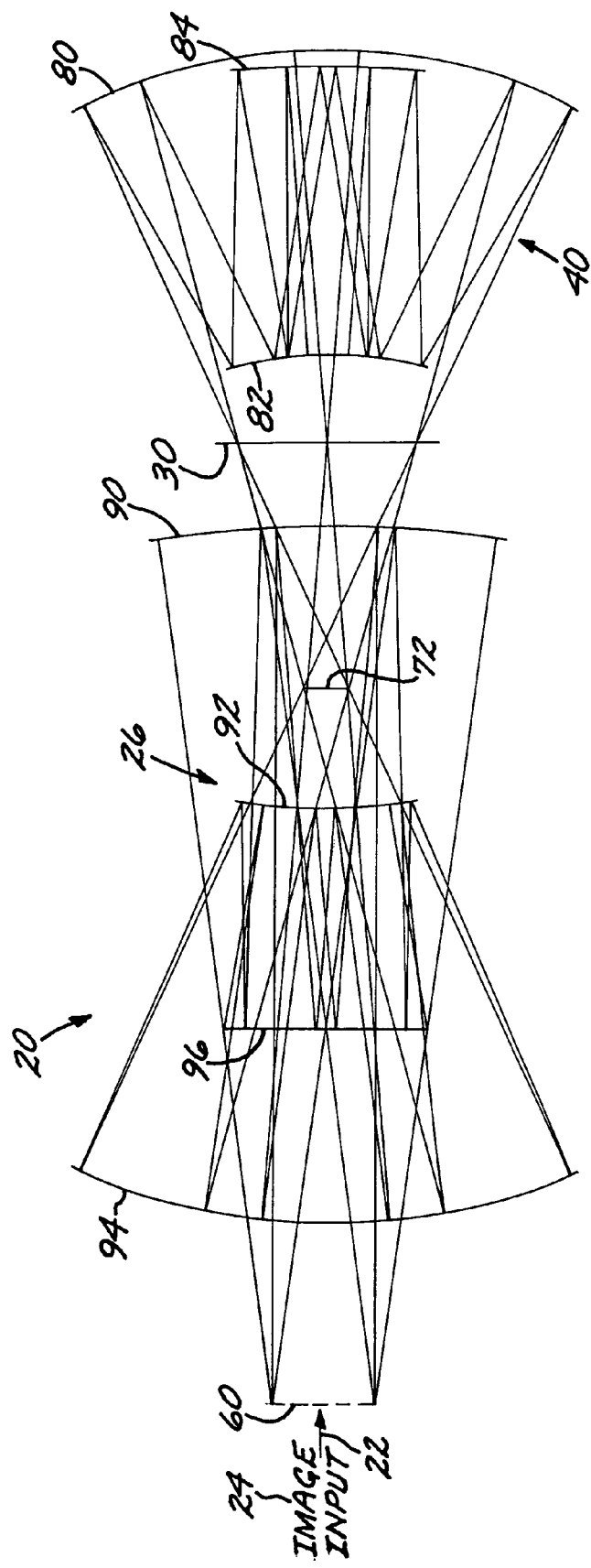
FIG. 5 is a spatial-dimension schematic view of the imaging spectrometer of FIG. 4.

FIGS. 2–3 and 4–5 illustrate the detailed construction of the imaging spectrometer 20 for an all-reflective, relayed optical system comprising a set of five powered mirrors whose powers sum to substantially zero (FIGS. 2–3) and a three-mirror anastigmat having an integral corrector mirror therein (FIGS. 4–5). In these figures, the elements discussed previously have been assigned the corresponding reference numbers, and the prior description is incorporated. In some cases, reference numbers have been omitted from some of FIGS. 2–5 for clarity.

Referring to FIGS. 2–3, a real entrance pupil 60 in the light energy 22 is located before the light energy 22 enters the objective module 26. In this embodiment, the objective module 26 is an all-reflective, relayed optical system comprising a set of five powered mirrors whose powers sum to substantially zero. The objective module 26 includes a first mirror 62 having positive optical power; a second mirror 64 having negative optical power, wherein the second mirror 64 receives the beam path reflected from the first mirror 62 and wherein an intermediate image is formed after the beam path reflects from the second mirror 64; a third mirror 66 having positive optical power, wherein the intermediate image on the beam path is reflected from the third mirror 66; a fourth mirror 68 having negative optical power, wherein the beam path received from the third mirror 66 is reflected by the fourth mirror 68; and a fifth mirror 70 having positive optical power, wherein the beam path received from the fourth mirror 68 is reflected by the fifth mirror 70 to the image plane 30. An exit pupil 72 is the image of the entrance pupil 60. This form of the objective module 26 is particularly useful because of its wide field of view, but it is relatively complex and must be aligned with great care because it includes five mirrors. An operable mirror arrangement of this type is disclosed in application Ser. No. 10/104,424.

As discussed previously, at the image plane 30 the first portion of the objective module output is incident upon the panchromatic detector (not shown in FIGS. 2–3) and the second portion passes through the exit slit 38 and to the collimating-and-imaging module 40.

The collimating-and-imaging module 40 is a reflective triplet including a positive-power primary mirror 80 that receives the objective-end input 42; a negative-power secondary mirror 82 that receives the beam path reflected from the primary mirror 80; and a positive-power tertiary mirror 84 that receives the beam path reflected from the secondary mirror 82. The beam reflected from the tertiary mirror 84 is the collimating-end output 44 of the collimating-and-imaging module 40 that is incident upon the dispersive element 46. A reflective triplet that is operable in this application is disclosed in U.S. Pat. No. 4,733,955, whose disclosure is incorporated by reference.

The dispersive element 46 may be of any operable type. Preferred dispersive elements 46 are reflection gratings and prisms. In the case of the reflection grating, the grating lines are perpendicular to the plane of the illustration in FIG. 2. In the case of the prism, the rear surface of the prism may be coated to reflect the incident light, or a separate flat mirror may be located immediately next to the back side of the prism. The position of the spectral-image-end output 50 of the dispersed light that passes back through the collimating-and-imaging module 40 is determined by the tilt of the reflection grating or prism.

In another embodiment, illustrated in FIGS. 4–5, the objective module 26 is an all-reflective, off-axis three-mirror anastigmat having an integral corrector mirror therein, for a total of four mirrors. The advantage of using this three-mirror anastigmat having the integral corrector mirror as the objective module 26 is that it offers a moderately wide field of view, and is less complex and is less challenging to align than the five-mirror objective of FIGS. 2–3, because it has only four mirrors.

Structurally, the embodiment of FIGS. 4–5 is like that of FIGS. 2–3, except as will be discussed next. The prior discussion of the embodiment of FIGS. 2–3 is incorporated here. The embodiment of FIGS. 4–5 differs in that the objective module includes four mirrors, with three mirrors arranged as a three-mirror anastigmat and the fourth mirror being a corrector mirror. Referring to FIGS. 4–5, the real entrance pupil 60 in the light energy 22 is located before the light energy 22 enters the objective module 26. The objective module 26 includes a three-mirror anastigmat including a first mirror 90 having positive optical power; a second mirror 92 having negative optical power, wherein the second mirror 92 receives the beam path reflected from the first mirror 90; and a third mirror 94 having positive optical power, wherein the third mirror 94 receives the beam path reflected from the second mirror 92. A nominally flat corrector mirror 96 lies in the beam path between the first mirror 90 and the second mirror 92 of the three-mirror anastigmat to fold the beam path between the mirrors 90 and 92. This form of the objective module 26 is useful because of its moderately wide field of view, but it has fewer mirrors and is therefore more readily aligned than the five-mirror objective module 26 of FIGS. 2–3. An operable mirror arrangement of this type is disclosed in U.S. Pat. No. 5,550,672, whose disclosure is incorporated by reference. The remainder of the imaging spectrometer 20 of FIGS. 4–5 is the same as described in relation to the embodiment of FIGS. 2–3.

The availability of a range of suitable objective modules 26 allows the designer of an optical imaging spectrometer to combine one of the objective modules 26 with the appropriate detectors 34 and 52, exit slit 38, collimating-and-imaging module 40, and dispersive element 46, all as described above, to produce the imaging spectrometer whose imaging spectrometer optical system is operable up to various maximum fields of view. The cost of the increased field of view is more complexity in the objective module 26. With the range of objective modules, fields of view of up to about 28 degrees may be obtained. If the required maximum field of view is not more than about 3 degrees, the objective module 26 is preferably selected to be an on-axis three-mirror anastigmat of the type disclosed in U.S. Pat. No. 4,101,195, whose disclosure is incorporated by reference. If the required maximum field of view is not more than about 8 degrees (preferably from about 3 to about 8 degrees), the objective module 26 is preferably selected to be an off-axis three-mirror anastigmat of the type disclosed in U.S. Pat. No. 4,265,510, whose disclosure is incorporated by reference. If the required maximum field of view is not more than about 16 degrees (preferably from about 8 to about 16 degrees), the objective module 26 is preferably selected to be the three-mirror anastigmat having an integral corrector mirror therein, as illustrated in FIGS. 4–5 hereof and as disclosed in U.S. Pat. No. 5,550,672. If the required maximum field of view is not more than about 28 degrees (preferably from about 16 to about 28 degrees), the objective module 26 is preferably selected to be the an all-reflective, relayed optical system comprising a set of five powered mirrors whose powers sum to substantially zero, as illustrated in FIGS. 2–3 hereof and as set forth in application Ser. No. 10/104,424.

With increasing capability for the wider field of view, these mirror arrangements for the objective modules become more complex and more difficult to align and maintain in alignment, and therefore it is not preferred to use an objective module with more maximum field-of-view capability than required. Thus, for example, if the required maximum field of view were to be 12 degrees, it would be preferred to select the four-mirror objective module 26 of FIGS. 4–5 hereof, rather than the five-mirror objective module 26 of FIGS. 2–3. Even though the five-mirror objective module 26 has a more-than-sufficient field of view to meet the requirement, it is more complex than the four-mirror objective module 26.

In an embodiment of the collimating-and imaging module 40, which may be used with the embodiments of the objective module 26 shown in FIGS. 2–3 or FIGS. 4–5, or any other operable type of objective module, the parameters of the reflective triplet (the mirrors 80, 82, and 84) that form the collimating-and-imaging module 40 may be selected to minimize or avoid entirely the "spectral smile" (also sometimes termed the "spectral frown") effect. The spectral smile is introduced by the dispersive element 46 and is manifested by an in-plane spatial curvature of the spectral images sensed by the hyper-spectral imaging detector 52 into a bowed form. The origin of the spectral-smile effect is discussed at greater length in James and Stemberg, "The Design of Optical Spectrometers", Chapman and Hall, Ltd., pages 62–68 (1969).

The concern with the spectral smile is a matter of degree in the required linearity of the hyper-spectral image. The prior art in reflective triplet optical forms with real entrance pupils as taught in U.S. Pat. No. 4,733,955, and specifically in the optical prescription of an embodiment given therein, is suitable and desired for certain imaging applications. Indeed, the re-creation and raytracing of the prescription provided in the '955 patent shows that the 80 percent geometrical blur diameters average only 42 microradians across the field of view, and that the optical scene distortion is only 0.3 percent. The measure of optical scene distortion used here is calculated as follows at the image plane: the tangential intercept of the chief ray at the center of the field of view is subtracted from the tangential intercept of the chief ray at the edge of the (sagittal) field of view; and this difference is divided by the sagittal intercept of the chief ray at the edge of the (sagittal) field of view. Both of these performance parameters are suitably low and acceptable for certain applications.

In other cases, however, these performance parameters are not sufficient, and it is desirable to improve the hyper-spectral image to minimize or avoid the nonlinearity associated with the spectral smile. In one embodiment of the present approach, where the reflective triplet is to be used as the collimating and imaging module 40 of the imaging spectrometer 20, low geometrical aberration is still highly desired, but it is also desired that a significant amount of optical scene distortion be intentionally introduced into the reflective triplet design to correct for the spectral smile that is caused by the dispersive grating or prism. Specifically, if the grating or prism introduces X percent spectral smile in the final dispersed image, it is desired that the reflective triplet exhibit −X/2 percent optical scene distortion as an independent imaging module, such that on the collimating and imaging passes through the reflective triplet, the −X/2 percent optical scene distortions of each pass add together and cancel the X percent spectral smile.

The intentional introduction of optical scene distortion and the maintenance or improvement of geometrical aberration correction is accomplished in the following manner and is illustrated by the optical prescription presented below. Using a conventional optical raytrace design and analysis software application, the designer must manipulate the elements of the optical prescription, with particular attention to the tilts and decenters of the three mirrors and the higher order aspheric surface figures of the three mirrors in order to introduce optical scene distortion and maintain good geometrical aberration correction.

More specifically, the mirror parameters are optimized through the use of an optical Figure of Merit (sometimes termed the "Error Function"), which describes or promotes certain levels of geometrical aberration and scene distortion using computer raytracing optimization techniques. These techniques are discussed in reference works such as Milton Laikin, "Lens Design", Marcel Dekker, Inc., New York, 1991, pages 1–14 (1990) and implemented in commercially available optics software codes such as those described in the Laikin reference. The preferred approach is to first design the reflective triplet of the collimating-and-imaging module 40 to have acceptable image quality and low distortion, while focusing the output of the dispersive element 46 onto the hyper-spectral image detector at the image plane 30. This basic design is that established, for example, by the prescription of the '955 patent and discussed above. This basic design is then modified to totally or partially cancel the spectral-smile, while retaining the first-order parameters and imaging functionality of the basic design. Allowable variables in the minimization of the Figure of Merit include the spacings, tilts, and decenters of the three mirrors 80, 82, and 84 in relation to each other, and the radii and higher order aspheric surface figures of each of the three mirrors. Because the light passes through the collimating-and-imaging module twice, the correction on each pass is one-half of the spectral smile.

FIG. 6 (parts 6A and 6B) sets forth an optical prescription derived from these principles, for the three mirrors 80, 82, and 84 of the reflective triplet of the collimating-and-imaging module 40, using the convention set forth in U.S. Pat. No. 5,550,672, This prescription has some of the same optical characteristics as the one given in the '955 patent: 10 unit aperture, 40 unit focal length, F/4.0 optical speed, and 1×20 degree field of view. In contrast to the embodiment of the '955 patent, the prescription presented in FIG. 6 has 2 percent optical scene distortion intentionally introduced (as defined above) and has geometrical 80 percent blur diameters that are only 22 microradians. This represents an improvement in aberration correction by a factor of 2. When used as the collimating and imaging module 40 in the imaging spectrometer 20, the embodiment presented here will correct for a 4 percent spectral smile introduced by the dispersive element.

FIG. 7 (parts A–C) makes use of the optical prescription of FIG. 6 (parts A and B), but in a double-pass configuration in conjunction with a two-material prism to demonstrate the cancellation of the spectral smile. Optical raytracing of the prescription of FIG. 7 shows that (1) the spectral band of 0.4 to 2.5 micrometers is dispersed over a distance of 0.685 units at the final image plane, (2) the geometrical 80 percent blur diameters average only 30 microradians across the field of view, and (3) there is considerable reduction of the spectral smile. At the center wavelength of 1.55 micrometers, the curvature of the slit image is below 0.05 percent, while at the lower and upper ends of the spectrum (0.4 and 2.5 micrometers, respectively), the residual spectral smile is about +0.1 and −0.1 percent, respectively. This opposite-sign balancing of the residual image curvature at the wavelength extremes indicates the practical limit in the elimination of spectral smile. Compared to the 4 percent uncorrected spectral smile, the reduction to a 0.1 percent residual is substantial.

This desired end result that minimizes spectral smile through subtle design variations in the mirrors of the collimating-and-imaging module is not achievable with many optical forms, particularly not in those dependent to a high degree on symmetry principles for their basic imaging operation. The Schmidt camera imaging optics (which also has a curved image surface) and Offner relay optics are two such examples where concentric symmetry principles are the basis for imaging with low aberrations and low distortion. Departures from those symmetry principles in an attempt to introduce significant optical scene distortion lead to a rapid and highly undesirable loss of geometrical aberration correction.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. An imaging spectrometer, comprising:
   an all-reflective objective module that receives an image input and produces an objective module output at an exit slit, wherein the objective module is selected from the group consisting of a three-mirror anastigmat having an integral corrector mirror therein, and an all-reflective, relayed optical system comprising a set of five powered mirrors whose powers sum to substantially zero;
   an imaging detector which receives a first portion of the objective module output;
   an all-reflective collimating-and-imaging module that receives a second portion of the objective module output as an objective-end input and produces a collimating-end output, wherein the collimating-and-imaging module comprises a reflective triplet, and wherein a mirror of the collimating-and-imaging module includes an intentionally introduced distortion to correct for spectral smile; and
   a dispersive element that receives the collimating-end output and produces a dispersive-end input into the collimating-and-imaging module that is reflected through the collimating-and-imaging module to produce a spectral-image-end output.

2. The imaging spectrometer of claim 1, wherein the objective module comprises the three-mirror anastigmat having the integral corrector mirror.

3. The imaging spectrometer of claim 1, wherein the objective module comprises the all-reflective, relayed optical system comprising the set of five powered mirrors whose powers sum to substantially zero.

4. The imaging spectrometer of claim 1, wherein the dispersive element is a reflection grating.

5. The imaging spectrometer of claim 1, wherein the dispersive element is a prism.

6. The imaging spectrometer of claim 1, wherein the imaging detector is
   a panchromatic imaging detector that receives at least a portion of the objective module output, and wherein the imaging spectrometer further includes
   a hyper-spectral imaging detector that receives at least a portion of the spectral-image-end output of the collimating-and-imaging module.

7. The imaging spectrometer of claim 1, wherein the reflective triplet comprises three mirrors, and wherein the collimating-and-imaging module includes an intentionally introduced distortion in spacings, tilts, or decenters of the three mirrors in relation to each other, or in the shape of at least one of the three mirrors to correct for spectral smile.

8. An imaging spectrometer, comprising:
   an all-reflective objective module that receives an image input and produces an objective module output at an exit slit;
   an all-reflective collimating-and-imaging module that receives at least a portion of the objective module output as an objective-end input and produces a collimating-end output, wherein the collimating-and-imaging module comprises a reflective triplet, wherein a mirror of the collimating-and-imaging module includes an intentionally introduced distortion to correct for spectral smile; and
   a dispersive element that receives the collimating-end output and produces a dispersive-end input into the collimating-and-imaging module that is reflected through the collimating-and-imaging module to produce a spectral-image-end output.

9. The imaging spectrometer of claim 8, wherein the objective module comprises a three-mirror anastigmat.

10. The imaging spectrometer of claim 8, wherein the objective module is selected from the group consisting of a three-mirror anastigmat having an integral corrector mirror therein, and an all-reflective, relayed optical system comprising a set of five powered mirrors whose powers sum to substantially zero.

11. The imaging spectrometer of claim 8, wherein the objective module comprises a three-mirror anastigmat having an integral corrector mirror.

12. The imaging spectrometer of claim 8, wherein the objective module comprises the all-reflective, relayed optical system comprising a set of five powered mirrors whose powers sum to substantially zero.

13. The imaging spectrometer of claim 8, wherein the dispersive element is a reflection grating.

14. The imaging spectrometer of claim 8, wherein the dispersive element is a prism.

15. The imaging spectrometer of claim 8, further including
   a panchromatic imaging detector that receives at least a portion of the objective module output, and
   a hyper-spectral imaging detector that receives at least a portion of the spectral-image-end output of the collimating-and-imaging module.

16. The imaging spectrometer of claim 15, wherein the panchromatic imaging detector and the hyper-spectral imaging detector are located on opposite sides of an image plane coincident with the exit slit.

17. The imaging spectrometer of claim 16, wherein the panchromatic imaging detector and the hyper-spectral imaging detector are both flat.

18. An imaging spectrometer comprising an all-reflective imaging spectrometer optical system operable to a required maximum field of view of up to about 28 degrees, the imaging spectrometer optical system comprising:
   an all-reflective objective module that receives an image input and produces an objective module output at an exit slit, wherein the objective module is
   an on-axis three mirror anastigmat if the required maximum field of view is not more than about 3 degrees, an off-axis three mirror anastigmat if the required maximum field of view is from about 3 to about 8 degrees, a three-mirror anastigmat having an integral corrector mirror therein if the required maximum field of view is from about 8 to about 16 degrees, or an all-reflective, relayed optical system comprising a set of five powered mirrors whose powers sum to substantially zero if the required maximum field of view is from about 16 to about 28 degrees;

an all-reflective collimating-and-imaging module that receives at least a portion of the objective module output as an objective-end input and produces a collimating-end output, wherein the collimating-and-imaging module comprises a reflective triplet, a dispersive element that receives the collimating-end output and produces a dispersive-end input into the collimating-and-imaging module that is reflected through the collimating-and-imaging module to produce a spectral-image-end output, and wherein the all-reflective collimating-and-imaging module is corrected for the introduction of spectral smile by the dispersive element.

19. The imaging spectrometer of claim 18, further including a panchromatic visible-light imaging detector that receives at least a portion of the objective module output, and a hyper-spectral imaging detector that receives at least a portion of the spectral-image-end output of the collimating-and-imaging module.

20. The imaging spectrometer of claim 18, wherein the objective module is the on-axis three mirror anastigmat.

21. The imaging spectrometer of claim 18, wherein the objective module is the off-axis three mirror anastigmat.

22. The imaging spectrometer of claim 18, wherein the objective module is the three-mirror anastigmat having an integral corrector mirror therein.

23. The imaging spectrometer of claim 18, wherein the objective module is the all-reflective, relayed optical system comprising a set of five powered mirrors whose powers sum to substantially zero.

24. A method for selecting an imaging spectrometer comprising an all-reflective imaging spectrometer optical system responsive to a required maximum field of view, comprising the steps of:

determining a required maximum field of view of up to about 28 degrees;

selecting an all-reflective objective module that receives an image input and produces an objective module output at an exit slit, wherein the objective module is selected, responsive to the required maximum field of view, from the group consisting of an on-axis three mirror anastigmat if the required maximum field of view is not more than about 3 degrees, an off-axis three mirror anastigmat if the required maximum field of view is from about 3 degrees to about 8 degrees, a three-mirror anastigmat having an integral corrector mirror therein if the required maximum field of view is from about 8 degrees to about 16 degrees, and an all-reflective, relayed optical system comprising a set of five powered mirrors whose powers sum to substantially zero if the required maximum field of view is from about 16 degrees to about 28 degrees;

providing an all-reflective collimating-and-imaging module that receives at least a portion of the objective module output as an objective-end input and produces a collimating-end output, wherein the collimating-and-imaging module comprises a reflective triplet, providing a dispersive element that receives the collimating-end output and produces a dispersive-end input into the collimating-and-imaging module that is reflected through the collimating-and-imaging module to produce a spectral-image-end output, and wherein the step of providing the all-reflective collimating-and-imaging module includes the step of providing the all-reflective collimating-and-imaging module corrected for the introduction of spectral smile by the dispersive element.

* * * * *